(12) United States Patent
Levin et al.

(10) Patent No.: US 11,323,254 B2
(45) Date of Patent: May 3, 2022

(54) DEVICE, SYSTEM, AND METHOD OF GENERATING AND HANDLING CRYPTOGRAPHIC PARAMETERS

(71) Applicant: Arm Limited, Cambridge (GB)

(72) Inventors: Ruvein Itskhak Levin, Shoham (IL); Ury Kreimer, Tekoa (IL)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 15/733,921

(22) PCT Filed: Apr. 25, 2019

(86) PCT No.: PCT/GB2019/051153
§ 371 (c)(1),
(2) Date: Dec. 1, 2020

(87) PCT Pub. No.: WO2019/239094
PCT Pub. Date: Dec. 19, 2019

(65) Prior Publication Data
US 2021/0226783 A1 Jul. 22, 2021

(30) Foreign Application Priority Data
Jun. 12, 2018 (GB) .................................... 1809593

(51) Int. Cl.
*H04L 9/08* (2006.01)
*H04L 9/06* (2006.01)
*H04L 9/30* (2006.01)

(52) U.S. Cl.
CPC .......... *H04L 9/0869* (2013.01); *H04L 9/0656* (2013.01); *H04L 9/0866* (2013.01); *H04L 9/3033* (2013.01); *H04L 2209/805* (2013.01)

(58) Field of Classification Search
CPC ... H04L 9/0869; H04L 9/0656; H04L 9/0866; H04L 9/3033; H04L 2209/805
(Continued)

(56) References Cited

U.S. PATENT DOCUMENTS

2007/0121934 A1* 5/2007 Futa ..................... H04L 9/3033
380/28
2013/0051552 A1* 2/2013 Handschuh ........... H04L 9/0866
380/44

(Continued)

FOREIGN PATENT DOCUMENTS

EP 2273718 A1 1/2011

OTHER PUBLICATIONS

Omorog et al., 2018 IEEE Symposium on Computer Applications & Industrial Electronics (ISCAIE), "Enhanced Pseudorandom Number Generator based on Blum-Blum-Shub and Elliptic Curves", pp. 269-274 (Year: 2018).*

(Continued)

*Primary Examiner* — Khalil Naghdali
(74) *Attorney, Agent, or Firm* — Eitan Mehulal Sadot

(57) ABSTRACT

Device, system, and method of generating and handling cryptographic parameters. A first device and a second device store the same secret seed value, utilize the same deterministic pseudo-random number generation function, and utilize the same deterministic value modification function. The first device generates a candidate value, sequentially modifies its value, and performs primality testing until a confirmed prime number is found. The first device indicates to the second device, how many iterations of value modifications to perform in order to reach and thus re-generate therein the same already-confirmed prime number, without the need to perform any primality testing in the second device.

17 Claims, 5 Drawing Sheets

(58) Field of Classification Search
USPC .......................................................... 380/40
See application file for complete search history.

(56) References Cited

U.S. PATENT DOCUMENTS

| | | | |
|---|---|---|---|
| 2014/0355758 A1 | 12/2014 | Feix | |
| 2015/0063565 A1* | 3/2015 | Ansari | G06F 12/1408 |
| | | | 380/44 |
| 2016/0197724 A1* | 7/2016 | Nemiroff | H04L 9/0869 |
| | | | 380/46 |
| 2017/0346632 A1* | 11/2017 | Coulier | G06F 7/64 |
| 2020/0328886 A1* | 10/2020 | Newton | H04L 9/0869 |
| 2021/0126788 A1* | 4/2021 | Kitazawa | H04L 9/0825 |

OTHER PUBLICATIONS

International Search Report in PCT/GB2019/051153, dated Jul. 11, 2019.
Written Opinion of the International Searching Authority in PCT/GB2019/051153, dated Jul. 11, 2019.
International Preliminary Report on Patentability (IPRP) in PCT/GB2019/051153, dated Dec. 15, 2020.
Hua Pang et al., "Research of Distributed Parallel Computing Based on Mobile Agent", Innovative Computing, Information and Control, Sep. 2007.

* cited by examiner

DEVICE, SYSTEM, AND METHOD OF GENERATING AND HANDLING CRYPTOGRAPHIC PARAMETERS

CROSS-REFERENCE TO RELATED APPLICATIONS

This patent application is a National Stage of PCT international application number PCT/GB2019/051153, having an international filing date of Apr. 25, 2019, published as International Publication number WO 2019/239094 A1, which is hereby incorporated by reference in its entirety; which claims priority from United Kingdom patent application number GB 1809593.5, filed on Jun. 12, 2018, now United Kingdom patent number GB 2574613 B, which is hereby incorporated by reference in its entirety.

FIELD

Some embodiments relate to the field of information security and cryptography.

BACKGROUND

Millions of people worldwide utilize electronic device for various purposes on a daily basis. For example, people utilize a laptop computer, a desktop computer, a smartphone, a tablet, and other electronic devices, in order to send and receive electronic mail (e-mail), to browse the Internet, to play games, to consume audio/video and digital content, to engage in Instant Messaging (IM) and video conferences, to perform online banking transactions and online shopping, and to do various other tasks.

Some tasks utilize encryption of information. For example, a user may utilize the Internet to perform online shopping at an electronic commerce (e-commerce) vendor, or may utilize a dedicate mobile application ("app") to perform banking transactions. Data exchanged between the end-user device and a remote server (e.g., of the vendor, the bank, or the like) may be encrypted, for security purposes.

Some cryptographic systems utilize prime numbers for data encryption, for decryption, and/or for other cryptographic tasks. For example, the Rivest-Shamir-Adelman (RSA) cryptosystem may utilize a public encryption key and a private (secret) decryption key; such that the public encryption key is based on a product of two, secret, large prime numbers; and whereas knowledge of those two, secret, large prime numbers is required for data decryption.

DETAILED DESCRIPTION

Figure 1A:
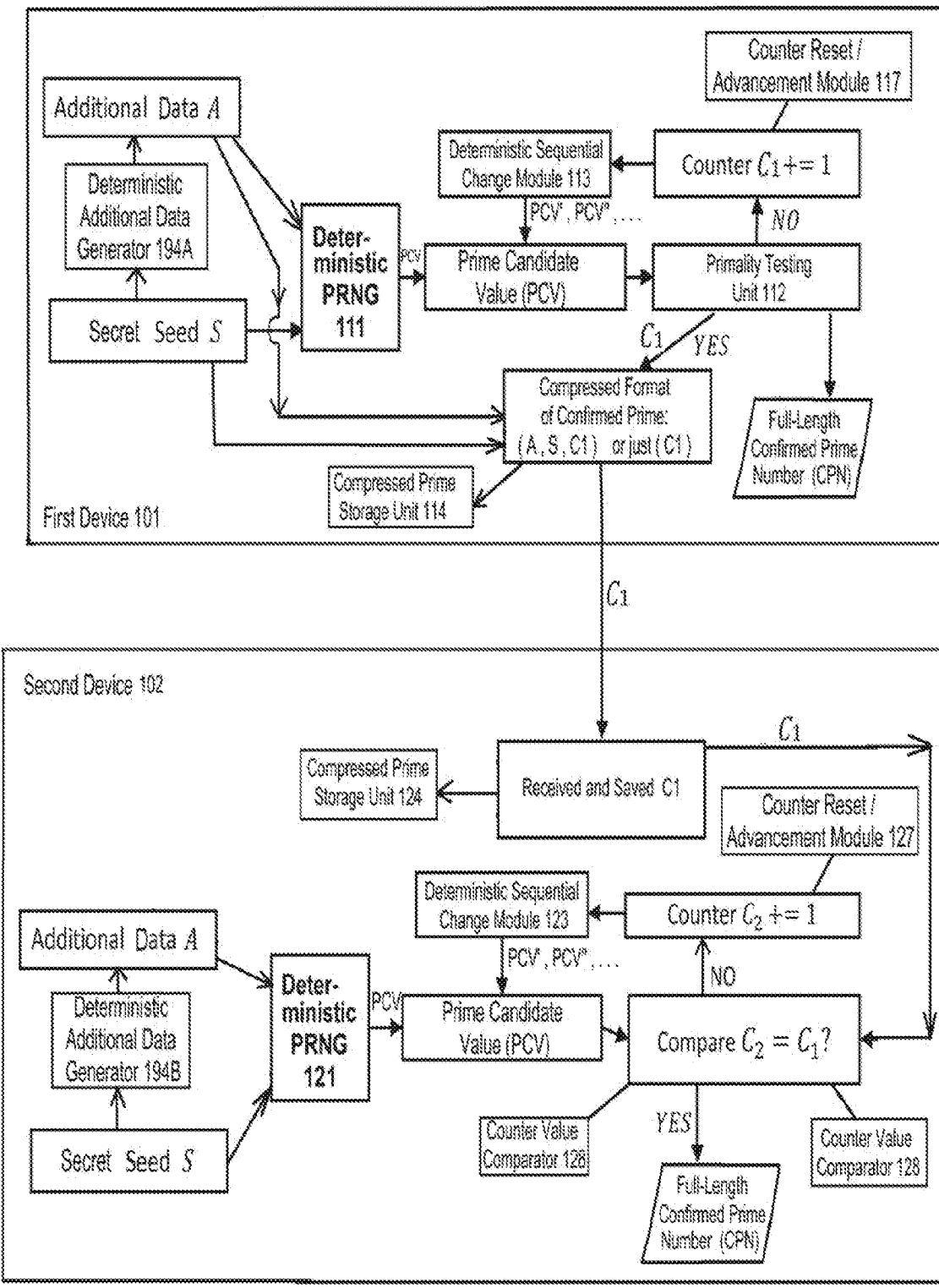
FIG. 1A is a schematic illustration of a system, in accordance with some demonstrative embodiments.

The Applicants have realized that while some cryptographic algorithms require generation of large prime numbers, some electronic devices lack the processing resources to perform this task adequately and/or rapidly. For example, a cellular phone or a portable electronic device or an "Internet of Things" (IoT) device may be produced with particular constraints, such as, having a small form-factor, having light-weight components, having limited battery power, having a low-power processor, having a limited amount of memory, or the like. Accordingly, such device may not be able to rapidly generate large prime number(s), or may be able to generate prime number(s) at a generation rate that may impede or burden the device's performance.

In accordance with some embodiments, a client-side device (or a "weaker" device) having limited processing resources has a need to generate prime number(s), and this task is partially-performed via a remote server or a remote processing device (or a "stronger" device) which has more abundant processing resources. For example, each one of the client device and the remote server is pre-configured to locally store the same, particular, secret data-item (e.g., a seed value); and to further store locally the same, particular, Deterministic Pseudo-Random Generation (D-PRNG) function for generating an initial candidate value and for performing a deterministic iteration function for sequential changing of the prime candidate value into other prime candidate values. The D-PRNG function is a function that receives as input the secret data-item (or, other particular value that is derived from the secret data-item); and is able to generate an initial pseudo-random candidate value, and a sequential iterating function performs multiple iterations using a counter. Each iteration of the iteration function (IF) yields a candidate number, which is then checked for primality. However, instead of performing multiple iterations of candidate generations via the D-PRNG and iteration function within the client-side device and then checking the primality of each candidate number within the client-side device, parts of the prime generation process are delegated by the client-side device to the remote server.

For example, the client-side device sends to the remote server an initial message indicating that the client-side device needs to utilize a large prime number. The remote server receives the message; and then performs multiple iterations of the D-PRNG function based on the secret data-item, and checks the primality of candidate output numbers until it can confirm primality of a candidate output number. For example, after 17 such iterations, the D-PRNG function at the remote server generates a candidate value that the remote server confirms to be prime. Then, in some implementations, the remote server sends to the client-side device a message which indicates, for example, "run your D-PRNG function for 17 iterations, without performing any primality test on any candidate; and the candidate value that is yielded by the 17th iteration of your D-PRNG function is a confirmed prime number"; thereby allowing the client-side device to skip all primality checks of all the 17 candidates.

Some implementations may be utilized in conjunction with various cryptographic units or systems, encryption units, decryption units, public key cryptography systems, as well as various field and group operations which utilize large prime numbers; and particularly with units and algorithms that utilize large prime numbers for generation of cryptographic assets, such as secret keys or decryption keys or private keys, such as Rivest-Shamir-Adelman (RSA) cryptosystems, Finite Field Cryptography (FFC) systems, Digital Signature Algorithm (DSA) systems, or the like.

Some portions of the discussion herein may relate, for demonstrative purposes, to a "server" or a "remote server" or a "server-side" device, which performs prime number generation tasks for a "client" device or a "client-side device" or an "end-user device"; or similarly, some portions of the discussion herein may relate, for demonstrative purposes, to a "strong" or "stronger" device or a "high computing resources device", which performs prime number generation tasks for a "weak" or "weaker" device or a "reduced computing resources device"; however, some embodiments may be utilized in conjunction with any two other types of devices, or in conjunction with any suitable system or pair-of-devices in which a First Device (be it of any suitable type) is requested or required to facilitate the generation of prime number(s) at (or in, or by) a Second device (be it of any suitable type); including, for example, a set or a network of devices in which a more-available device or a currently-available device is allocated (e.g., temporarily, or ad hoc, or in a one-time manner, or repeatedly, or in multiple occasions) to assist another device in the task of prime number(s) generation.

The Applicants have realized that some client-side devices, and particularly IoT devices or sensors, as well as limited-form-factor devices or portable devices, may be equipped with processors having reduced processing capabilities, and/or may be equipped with a limited amount of memory and particularly a secured memory (e.g., for saving large cryptographic keys); and may thus not be suitable for rapid, local, generation of prime numbers and/or of cryptographic keys.

The Applicants have further realized that in some cryptographic systems, such as the RSA cryptosystem, a significant portion of the processing resources and/or the processing time may be consumed by primality testing on prime candidates. For example, the Applicants have realized that an entry-level processor or a low-cost processor may spend several minutes or even several hours on a task of generating a single large prime number, due to multiple iterations of primality checks on multiple prime candidates, particularly when large size cryptographic keys needs to be generated (e.g., a 2,048-bit or a 4,096-bit or a 8,192-bit cryptographic key). The Applicants have also realized that secure storage of such long cryptographic keys in a secured memory may require relatively large storage space (e.g., 4-12 kilobits of secure storage for a single cryptographic key).

The Applicants have realized that a conventional device may perform generation of prime number(s) in a manner which may be time consuming and/or processing resource consuming. For example, the conventional device generates (e.g., randomly or pseudo-randomly) a secret seed value, or receives or obtains such secret seed value from another source. The secret seed value is then utilized as a seed value for a deterministic Pseudo Random Numbers Generation (PRNG) function. The Deterministic PRNG receives this seed value, and possibly receives additional data; and then performs a deterministic cryptographic algorithm which generates pseudo-random numbers which are "prime candidates". Then, the device performs primality testing of each current prime candidate, until a prime candidate is confirmed as a prime number. The Deterministic PRNG performs multiple iterations of generating prime candidates, as long as such candidates are still required and until primality testing confirms at least one prime candidate as a prime number.

Some embodiments comprise methods, systems, and devices for generating, transferring, compressing, storing, handling, and/or re-generating prime numbers, as well as cryptographic assets or cryptographic parameters that are related to (or based on) prime number(s). For example, a method comprises deterministic generation of initial prime candidates for each one of required primes, by using a secret seed and optionally also additional data, which are passed to Deterministic PRNG function. The generated prime candidates are passed to one or more primality testing function(s), for example, deterministic functions which perform primality testing. If the primality test fails, then the deterministic function(s) perform sequential changing of the already-tested prime candidates, according to a deterministic algorithm. For each prime candidate that is confirmed to be a prime number, the system saves a final value of the relevant Counter(s) that were utilized by the Deterministic PRNG function, thereby allowing to store and/or to transmit a compressed representation of the prime number based on the relevant value(s) of such Counter(s) (e.g., "the 17th iteration of the Deterministic PRNG is a confirmed prime", or "the 17th candidate generated by the Deterministic PRNG is a confirmed prime").

The value(s) of such counter(s) of the Deterministic PRNG, together with the secret seed value and optionally the additional data (e.g., key index), may be used as a "compressed form" or a "shorter version" of the confirmed prime numbers and therefore also to the cryptographic keys or cryptographic assets or cryptographic parameters that derive from such confirmed prime number(s), which can then be efficiently stored or saved on a small (e.g., secured) memory unit, may be rapidly transferred or transmitted, and/or may be rapidly re-generated on demand using the same Deterministic PRNG function by repeating the same iterations on prime candidates until reaching the given counter values, without the need to re-perform any primality tests, and thereby enabling re-generation of already-confirmed prime numbers by a reduced-power or limited-resources device.

In some implementations, the first generation of new set of the prime numbers and therefore their corresponding cryptographic keys in compressed form, is performed on a relatively "strong" device (e.g., a server computer having a relatively fast processor and abundant memory), which performs the primality testing for each prime candidate. The compressed data, indicating which counter values or which iteration of the Deterministic PRNG would yield the confirmed prime number, is then transmitted or transferred to a "weak" or "weaker" device (e.g., a portable electronic device, an IoT device) which perform rapid re-generation of that prime number without performing any primality testing.

The Applicants have realized that a device, even a relatively "weak" device having limited processing resources (e.g., portable device, IoT device), may be able to rapidly and efficiently generate a large, already-confirmed, prime number, based on: (I) a pre-defined Deterministic PRNG function, that is known to the "weak" device as well as to a remote server; and (II) a secret seed value, that is known only to the "weak" device as well as to that remote server; and (III) a Counter value or an Iterations Value, that indicates to the "weak" device exactly how many iterations of the Deterministic PRNG function are to be performed, based on the secret seed value, until a confirmed prime number is generated. Accordingly, a "stronger" device may perform initial generation of prime number(s), including the generation of multiple candidate numbers and including the primality testing for each such candidate; and then, the "stronger" device may indicate to the "weaker" device which iteration of the Deterministic PRNG would yield the already-confirmed prime number, such that the "weaker" device would rapidly re-generate on its side that already-confirmed prime number and would utilize it for cryptographic operations (e.g., for derivation or generation of a cryptographic key). Accordingly, when running the multiple iterations of the Deterministic PRNG, the "stronger" device saves and stores not only the confirmed prime numbers, but also the Counter Value(s) or the Iteration Value(s) that yielded the confirmed prime number(s); as those Counter values or Iteration values may later be transmitted, transferred, or otherwise transported to the "weaker" device and may enable rapid and efficient re-generation therein of such already-confirmed prime numbers; for example, without performing any primality testing on the "weaker" device.

In some embodiments, the transfer or the transmission or the transport of the "compressed data" (e.g., counter values, or iterations values) from the stronger device to the weaker device, need not necessarily be over (or via) a protected channel or a secured channel; for example, if the common seed value is pre-stored or pre-installed (e.g., in a secure manner) on both the weak device and the strong device as a "shared secret" that is known only to these two devices (e.g., pre-installed during serialization of the weak device); or if the common seed value is established in a secure manner that ensures that it is known only to the strong device and the weak device (e.g., using Diffie-Hellman (DH) key exchange).

Reference is made to FIG. 1A, which is a schematic illustration of a system 100, in accordance with some demonstrative embodiments. System 100 may comprise a first device 101 (which may also be referred to as the "assisting device") which may assist a second device 102 (which may also be referred to as the "assisted device") in the task of generating prime number(s). For example, the second device 102 may be a "weak" or "weaker" device, having limited processing resources; e.g., an IoT device or sensor; a portable device; a small form-factor device). In contrast, the first device 101 may be a "strong" or "stronger" device, having abundant or sufficient or adequate or non-reduced processing resources, e.g., a local server computer, a remote server computer, a "cloud computing" server or device. The components of system 100 may operate or co-operate to enable efficient generation, re-generation, handling, storing (or saving), and/or transferring (or transmitting, or transporting) of prime numbers; for example, of a single prime number (denoted P), or of multiple prime numbers.

The first device 101 and the second device 102 may communicate, or may exchange messages or signals, via one or more communication link(s) and/or communication channel(s) and/or communication network(s), which may not necessarily be (or comprise) a secured channel; for example, via a wired link, a wireless communication link, a cellular communication link, a cellular 2G or 3G or 4G or 4G-LTE or 5G communication link, a Wi-Fi link, an IEEE 802.11 link, a Wi-Max link, an IEEE 802.16 link, a Bluetooth link, a Zigbee link, a Local Area Network (LAN) or a Wireless LAN (W-LAN), or the like.

For example, the first device 101 receives or generates or pre-stores a secret seed (denoted S) and optionally also non-secret additional data (denoted A). In a demonstrative implementation, the secret seed (S) may have 256 bits; and the additional data (A) may be a hashed value of the secret seed S (for example, 1,792 bits of an output of a hashing function that is fed the secret seed S as input). In some implementations, the additional data (A) need not be secret; and may be store in a memory unit or storage unit that is not necessarily a secured memory; and may be transported or transmitted over a communication channel that need not necessarily be a secured channel.

The second device 102 pre-stores the same secret seed (S), or receives the same secret seed (S) via a secured channel from the first device 101 (or, from a trusted third party). The second device 102 further pre-stores the same additional data (A), or receives the additional data (A) from the first device 101 or from a trusted third party (e.g., via a secured channel, or even via a non-secured channel).

Accordingly, the same secret seed (S) is stored locally in the first device 101 and is stored locally in the second device 102; and, the same non-secret additional data (A) is stored locally in the first device 101 and is stored locally in the second device 102.

In some implementations, optionally, a Deterministic Additional Data Generator 194A may be included in the first device 101, and may locally generate there the additional data (A) from the secret seed (S) via a deterministic algorithm; for example, by a hashing algorithm or other deterministic transformation algorithm. Similarly, a Deterministic Additional Data Generator 194B may be included in the second device 101, and may locally generate there the additional data (A) from the secret seed (S) via the same deterministic algorithm which is employed by the Deterministic Additional Data Generator 194A of the first device 101. Accordingly, the two devices 101-102 may pre-store the same secret value (S); and each one of them may independently generate and store locally the same additional data (A).

In the first device, a Deterministic PRNG 111 generates a candidate value (or, a "prime candidate" or a "Prime Candidate Value" or "PCV"). As this is the initial candidate value, an Iterations Counter C1 is reset or is set to zero (e.g., via a Counter Reset/Advancement Module 117), before the generation of the first prime candidate value PCV, or immediately upon its generation. The first prime candidate value PCV is then tested for primality within the first device 101, by a suitable (e.g., deterministic) Primality Testing Unit 112. The primality testing may be performed by any suitable method(s) for determining whether an input number is prime; for example, by trial division algorithm (e.g., checking whether the number 2 or any odd number from 3 to Square-Root(P) divides the prime candidate value PCV without leaving a remainder), or by elliptic curve primality testing, or the like.

If the primality test result for the prime candidate value PCV is "false" (or "fail", or "untrue"), indicating that the prime candidate value PCV is not a prime number, then: a Deterministic Sequential Change Module 113 deterministically and sequentially modifies the value of the prime candidate value PCV into a new prime candidate value, denoted PCV'; and the value of the Iterations Counter C1 is increased by one (e.g., by the Counter Reset/Advancement Module 117) to indicate that a first iteration of sequential change has just been performed. The Deterministic Sequential Change Module 113 may utilize any suitable deterministic function that changes, in a deterministic (non-random) manner, a previous prime candidate value PCV into a new, different, prime candidate PCV'; for example, by adding the value "2" (decimal) to the previous prime candidate PCV, or by performing other deterministic operations (for example, operations that are described in ANSI X9.31, section B4, "Generation of Primes", Steps 2, 3, 4). The new prime candidate PCV' is then fed into the Primality Testing Unit 112, and the process is repeated iteratively (e.g., sequentially changing the value of the prime candidate value PCV' in a deterministic manner, while respectively updating the Iterations Counter C1 in each iteration), until a first prime candidate value yields a primality test result of "true", indicating a confirmed prime number.

Once the primality test result for a prime candidate value is "true", such as for prime candidate value PCV''' that was generated after three sequential changes of the initial PCV, then this particular prime candidate value is a confirmed prime number, denoted CPN. Optionally, the primality testing unit 112 outputs or locally stores within the first device the full-length confirmed prime number CPN. A Compressed Prime Storage Unit 114 locally stores within the first device 101 a "compressed version" or a "short format" or a "reduced-size version" of the confirmed prime number CPN. In some implementations, the compressed version of the confirmed prime number CPN may be a three-item data-set which includes: (i) the secret seed value S, and (ii) the additional data A, and (iii) the value of the Iterations Counter C1 at the time in which the primality test result was positive. In other implementations, the compressed version of the confirmed prime number CPN may be just a single number (e.g., having a value of zero or a natural number), which indicates only the value of the Iterations Counter C1 at the time in which the primality test result was positive (since the secret seed value S and the additional data A are already pre-stored elsewhere in the first device 101, and are fixed values, and are already known to the second device 102).

The compressed version of the confirmed prime number CPN may then be transferred, transported or transmitted from the first device 101 to other device(s), and particularly to the second device 102, via one or more wired and/or wireless communication link(s), and/or via a protected communication channel or even via a non-protected communication channel. For example, the first device 101 may transmit or transfer or transport to the second device 102, a message or a signal indicating the final value of the Iterations Counter C1.

Upon receiving the compressed version of the confirmed prime number, the second device 102 may operate to re-generate, locally on its side, the full version or the full-length non-compressed version of the confirmed prime number CPN.

As mentioned, the second device 102 securely stores therein the same secret seed value S that is also securely stored in the first device 101; and, the second device 102 also stores therein (securely or non-securely) the same additional data A that is also stored in the first device 101. Furthermore, the second device has a Deterministic PRNG 121 which is identical to the Deterministic PRNG 111 of the first device; namely, the Deterministic PRNG 121 of the second device 102, comprises or has or utilizes the same Deterministic PRNG function that is utilized by the Deterministic PRNG 111 of the first device 101. Additionally, the second device 102 comprises a Deterministic Sequential Change Module 123, which has or comprises or utilizes the same Deterministic Sequential Change function that is used by the Deterministic Sequential Change Module 113 of the first device 101.

In contrast with the first device 101, a Primality Testing Unit is absent from the second device 102, or is not included in the second device 102, or is excluded from the second device 102; or, in some implementations, a Primality Testing Unit may be included in the second device 102 (e.g., due to mass-production considerations or constraints) but is de-activated or is turned-off or is bypassed or is non-utilized at all by the second device 102.

The second device 102 receives from the first device 101 the compressed version of the confirmed prime number CPN; for example, by receiving from the first device 101 only the final value of the Iterations Counter C1 that was reached at the first device 101 upon confirming primality.

The Deterministic PRNG 121 of the second device 102 proceeds to locally generate the initial prime candidate value PCV, based on the secret seed value S and the additional data A. Sine this is the initial candidate, a local Iterations Counter C2 in the second device 102 is reset or is set to zero (e.g., via a Counter Reset/Advancement Module 127). The initial prime candidate value CPN is not tested for primality within the second device 102. Rather, the value of the second device's Iterations Counter C2, is compared to (or checked against) the received value of the first device's Iterations Counter C1 (e.g., via a Counter Value Comparator 128); thereby checking whether the recently-performed operation of the Deterministic PRNG 121 of the second device 102 has the same iteration-number as the iteration-number that yielded the confirmed prime number (CPN) in the first device 101.

If the checking result is positive, namely, the current value of the Iterations Counter C2 of the second device 102 is equal to the value of C1 received from the first device 101 as its final Iterations Counter C1, then: the output of the Deterministic PRNG 121 of the second device 102 is further utilized (e.g., for cryptographic purposes) as a confirmed prime number CPN, and/or is stored in a full-length/non-compressed format (e.g., storing all the bits or all the digits of such confirmed prime number CPN) locally within the second device (e.g., securely, in a secured memory); and optionally, the current value of the Iterations Counter C2 is also stored locally within the second device 102, to enable further re-generation of that particular confirmed prime number CPN from that final value of the Iterations Counter C2.

In contrast, if the checking result is negative, namely, the current value of the Iterations Counter C2 of the second device 102 is not equal to the value of C1 received from the first device 101 as its final Iterations Counter C1, then: the prime candidate value PCV is discarded, as it is not a confirmed prime number; and the value of the Iterations Counter C2 of the second device 102 is increased by one (e.g., by the Counter Reset/Advancement Module 127); and the Deterministic Sequential Change Module 123 of the second device 102 operates to deterministically and sequentially change, in a deterministic (non-random) manner, the most-recent prime candidate value PCV into a new, different, prime candidate value PCV'. Then, the new prime candidate PCV' is not tested for primality; but rather, the value of the Iterations Counter C2 of the second device 102 is compared to the value of the Iterations Counter C1 that was received from the first device 101; and the process repeats iteratively in the second device 102, until the value of the Iterations Counter C2 reaches (namely, is equal to) the value of the Iterations Counter C1 that was received from the first device 101, thereby indicating to the second device 102 that the most-recent sequentially-modified prime candidate value PCV (e.g., PCV''' if three sequential changes were made) is indeed a confirmed prime number CPN, which may then be used by the second device for cryptographic tasks.

Since both the first device 101 and the second device 102, utilize the same seed value S, the same additional data A, the same Deterministic PRNG function (111, 121), and the same Deterministic Sequential Change function (113, 123), and since the second device 102 performed the same number of iterations (C2) as the number of iterations (C1) that was indicated by the first device 101 upon finding therein a confirmed prime number, the system 100 enables the second device 102 to re-generate therein the same already-confirmed prime, without performing any primality testing within the second device 102.

Optionally, a Compressed Prime Storage Unit 124 locally stores within the second device 102 a "compressed version" or a "short format" or a "reduced-size version" of the confirmed prime number CPN. In some implementations, the compressed version of the confirmed prime number CPN may be a three-item data-set which includes: (i) the secret seed value S, and (ii) the additional data A, and (iii) the value of the Iterations Counter C1 as received from the first device 101. In other implementations, the compressed version of the confirmed prime number CPN may be just a single number (e.g., having a value of zero or a natural number), which indicates only the value of the Iterations Counter C1 as received from the first device 101; since the secret seed value S and the additional data A are already pre-stored elsewhere in the second device 102, and are fixed values.

Figure 1B:
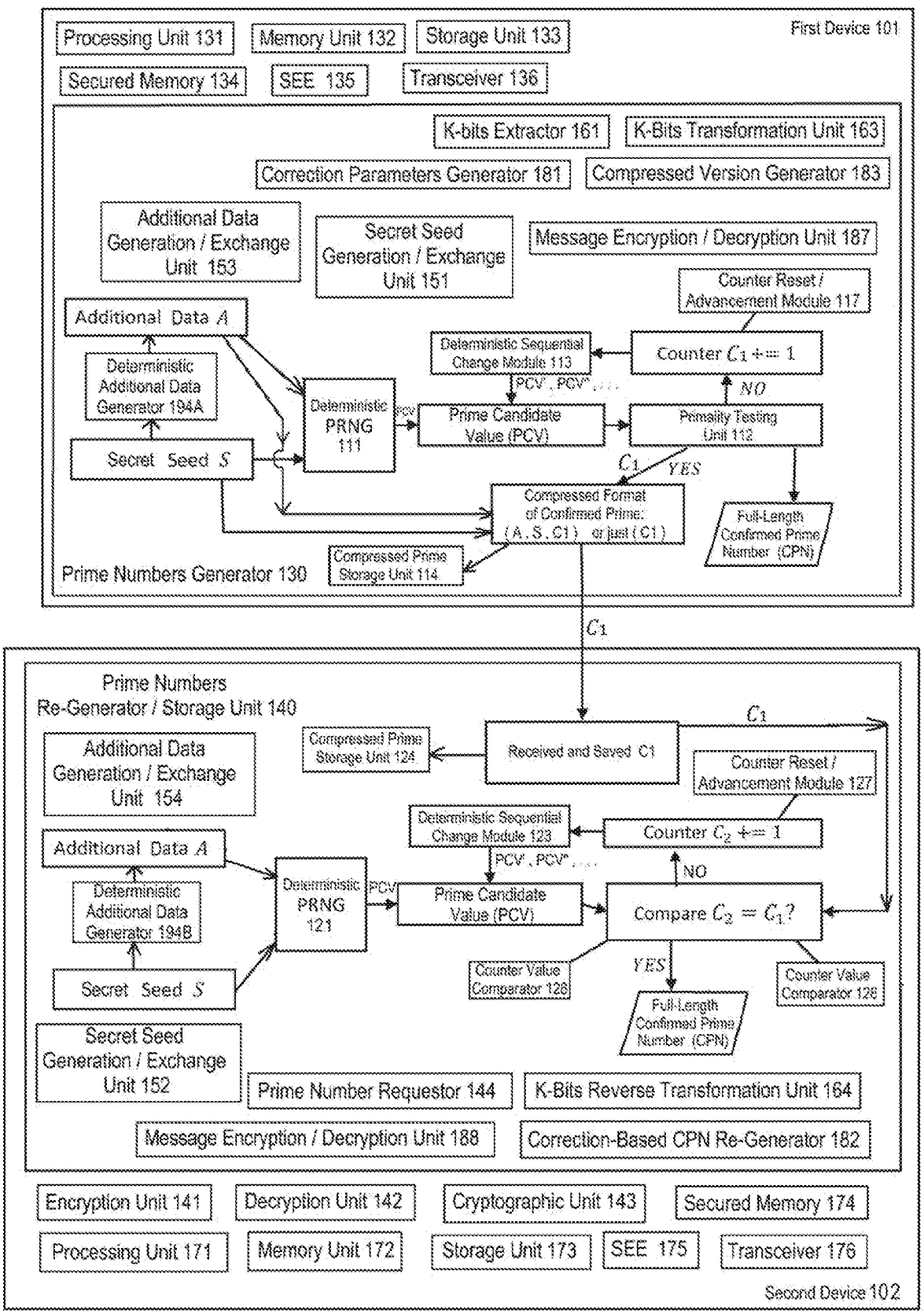
FIG. 1B is a more detailed illustration of the system, depicting additional components thereof.

In order to simplify the discussion, FIG. 1A depicts a demonstrative implementation of system 100, which focuses on the particular components that take part in the generation or re-generation of prime numbers. Reference is now made to FIG. 1B, which is a more-detailed illustration of system 100, depicting additional components which may be included therein.

For example, the first device 101 may comprise: a processing unit 131 (e.g., a processor, a processor core, an Integrated Circuit (IC), an Application-Specific Integrated Circuit (ASIC), a central processing unit (CPU), a graphics processing unit (GPU), a controller, or the like) able to execute code and/or instructions; a memory unit 132 (e.g., Random Access Memory (RAM), Flash memory) to store data, particularly for short-term or temporarily; a storage unit 133 (e.g., hard disk drive (HDD), solid state drive (SDD), Flash-based storage) to store data, particularly for long-term; a Secured Memory 134 which may be a dedicated memory unit or a dedicated portion or region of a memory unit that is secured from attacks and/or from tampering and/or from listening by non-authorized users or modules or applications; optionally, a Secured Execution Environment (SEE) 135, in which one or more of the processing operations may be performed; a wired or wireless transceiver 136 able to communicate with the second device 102 (e.g., able to receive from the second device 102 a message or a signal requesting to generate a prime number; able to send or transmit to the second device 102 a message comprising the a compressed version or a reduced-size representation of the confirmed prime); and/or other suitable components or modules or units which may optionally be part of a computer or a computer server (e.g., keyboard, mouse, display unit, power source, Operating System (OS), drivers, applications, or the like). Optionally, some or all of the components of the first device 101, that are involved in the generation of prime number(s), may be implemented as (or as part of) a Prime Numbers Generator unit 130.

The second device 102 may comprise, for example: an encryption unit 141 able to perform encryption of data; a decryption unit 142 able to perform decryption of data; a cryptographic unit 143 able to perform other cryptographic operations or security-related operations (e.g., hashing, salting, authentication, generating or applying or validating a digital signature, or the like). Optionally, some or all of the components of the second device 102, that are involved in the re-generation of prime number(s) and/or in their storage in a compressed form, may be implemented as (or as part of) a Prime Numbers Re-Generator/Storage unit 140.

Optionally, the second device 102 may comprise: a processing unit 171 (e.g., a processor, a processor core, an Integrated Circuit (IC), an Application-Specific Integrated Circuit (ASIC), a central processing unit (CPU), a graphics processing unit (GPU), a controller, or the like) able to execute code and/or instructions; a memory unit 172 (e.g., Random Access Memory (RAM), Flash memory) to store data, particularly for short-term or temporarily; a storage unit 173 (e.g., hard disk drive (HDD), solid state drive (SDD), Flash-based storage) to store data, particularly for long-term; a Secured Memory 174 which may be a dedicated memory unit or a dedicated portion or region of a memory unit that is secured from attacks and/or from tampering and/or from listening by non-authorized users or modules or applications; optionally, a Secured Execution Environment (SEE) 175, in which one or more of the processing operations may be performed; a wired or wireless transceiver 176 able to communicate with the first device 101 (e.g., able to send to the first device 101 a message or a signal requesting to generate a prime number; able to receive from the first device 101 a message comprising or reflecting a compressed version or a reduced-size representation of the confirmed prime number); and/or other suitable components or modules or units which may optionally be part of an electronic device (e.g., keyboard, mouse, display unit, screen, touch-screen, accelerator, compass unit, gyroscope, one or more other sensor(s), Global Positioning System (GPS) unit, battery or other power source, Operating System (OS), drivers, applications, "apps" or "mobile apps", or the like).

One or more of the encryption unit 141, the decryption unit 142, and/or the cryptographic unit 143, may occasionally or periodically need to use a large prime number, for example as part of a cryptographic operation. A Prime Number Requestor 144 of the second device 102 may send a message or a signal to the first device 102, such as wirelessly (or over a wired link) via a transceiver 145, indicating a request to receive from the second device 102 a new prime number in a compressed format. Subsequently, the transceiver 176 (or other receiver unit) of the second device 102 may receive back from the first device 101, a message comprising or indicating the compressed format of an already-confirmed prime number, whose primality had been tested and confirmed by the first device 101; and the received compressed format enables the Prime Numbers Re-Generator/Storage unit 140 of the second device 102 to locally re-generate that same already-confirmed prime number, without the need to locally test or re-test for its primality.

System 100 may optionally comprise one or more other suitable components, units and/or modules. For example, in some implementations, the first device 101 and the second device 102 may comprise a Secret Seed Generation/Exchange Unit (151, 152), enabling the two devices 101-102 to generate and/or exchange (in a secure manner) the secret seed value; for example, using Diffie-Hellman (DH) key exchange or using other key establishment/key exchange algorithms.

Optionally, the first device 101 and the second device 102 may comprise an Additional Data Generation/Exchange Unit (153, 154), enabling the two devices 101-102 to generate and/or to exchange (e.g., in a secure manner) the same Additional Data (A) that is utilized as input (with the secret seed value S) by the Deterministic PRNG (111, 121). For example, in some implementations, the Additional Data (A) may be (or may comprise) a hashed value of the secret seed value, or a hashed value of at least a portion of the secret seed value; wherein both the first device 101 and the second device 102 utilize the same hashing function that operates on the same seed value, or on the same portion of the seed value, and this may be implemented via their Deterministic Additional Data Generators (194A, 194B). In other implementations, the Additional Data (A) may be generated by a function that deterministically inflates a small-size seed value to become a larger-size additional data; or, may be generated by the first device 101 and then may be securely transmitted from the first device 101 to the second device 102; or, may be generated by the second device 102 and then may be securely transmitted from the second device 102 to the first device 101.

In some implementations, optionally, system 100 may utilize other suitable formats or versions of reduced-size representation of an already-confirmed prime number, which enable rapid re-generation of the already-confirmed prime number without the need to perform or to re-perform primality tests of candidate numbers; and such other formats need not necessarily comprise the value of the Iterations Counter (C1). For example, instead of sending the final value of the Iterations Counter (C1) that corresponds to the final iteration of sequentially modifying the prime candidate value PCV, the first device 101 may take the full-length confirmed prime number CPN; may extract from it only the K right-most bits (or digits) or only the K least-significant bits (or digits), for example, via a K-bits Extractor 161 which extracts only the 8 or the 12 or the 16 or the 24 or the 32 or the 64 least-significant/right-most bits (or digits) of the full-length confirmed prime number. The extracted K-bits may be sent from the first device 101 to the second device 102, instead of sending the value of the Iterations Counter C1. Then, the second device 102 generates prime candidate values, in an iterative manner; but instead of counting the iterations of generation and comparing the counter values until reaching C1, the second device 102 compares the K right-most/least-significant bits of each locally-generated prime candidate, to the K-bits item that was received from the first device 101 and which belong to the already-confirmed prime number. If the K right-most/least-significant bits of the currently generated prime candidate, are identical to the K-bits item that was received from the first device 101, then the second device 102 determines that the current prime candidate is indeed the already-confirmed prime number, and further utilizes it for cryptographic tasks. In contrast, if the K right-most/least-significant bits of the currently generated prime candidate, are not identical to the K-bits item that was received from the first device 101, then the second device 102 determines that the current prime candidate is not the confirmed prime, and the second device 102 proceeds to perform additional iteration(s) of locally generating prime candidates and checking their K right-most/least-significant bits, until a match is found. The comparison operations may be performed, for example, by a K-Bits Comparator unit 162 in the second device.

In some implementations, instead of sending the right-most K bits or the least-significant K bits of the full-length confirmed prime number in their "as is" format, optionally, a Transformed Version of those K bits may be prepared at the first device 101, for example, via a K-Bits Transformation Unit 163 that takes those K bits and subtracts them from (or, XORs them with) the secret seed value S (or, the additional data A), the result of such operation (subtraction; or XOR; or other transformation operation) being the Transformed Version that is sent from the first device 101 to the second device 102. Then, the second device 102 receives the Transformed Version of those right-most/least-significant K bits of the full-length confirmed prime, and locally performs the reverse transformation operation (e.g., XOR with the seed value; or addition of the Transformed Version to the seed value), via a K-Bits Reverse Transformation Unit 164 which thus yields the actual value of those right-most/least-significant K bits of the full-length confirmed prime; which the second device 102 then compares to the right-most/least-significant K bits of each locally-generated (and non-tested) prime candidate, in order to determine whether a current prime candidate is indeed the already-confirmed prime number. The value of K itself (namely, how many right-most bits to send) may be pre-configured or may be dynamically determined, based on particular implementation considerations, optionally taking into account functions that estimate the frequency of prime numbers within a particular search-space.

In some implementations, the confirmed prime number CPN may be represented and/or conveyed to the second device 102 in a compressed or reduced-size form by utilizing one or more parameters which may be referred to as "Correction Factors" or "Correction Coefficients" or "Correction Parameters". For example, instead of sending from the first device 101 to the second device 102, the final value of the Iterations Counter C1 (or, the set of final values of such multiple Iterations Counters, such as the final values of Iteration Counters C1 through C6 that are discussed further herein), one or more Correction Parameters may be generated at the first device 101 by a Correction Parameters Generator 181, and may be sent from the first device to the second device 102, in which such Correction Parameters may be used by a Correction-Based CPN Re-Generator 182 to re-generate the confirmed prime number CPN. For example, the Deterministic PRNG 111 of the first device 101 may utilize the secret seed value (S) and the additional data (A) to generate a large, odd (non-even), pseudo-random number, denoted PRN-0; that number is saved locally in PRNG 111, as the initial output of the Deterministic PRNG 111, and is used as the initial prime candidate value PVC. The Deterministic Sequential Change Module 113 deterministically and sequentially modifies the PVC (e.g., by adding "2" decimal to the most-recent PVC), and the Primality Testing Unit 112 checks the primality of each such prime candidate value PVC until a confirmed prime number CPN is found. Then, a Compressed Version Generator 183 of the first device 101 may perform a XOR operation between the confirmed prime number CPN and the initial prime candidate PRN-0, and the XOR result is stored locally as the Correction Parameter that can immediately transform the initial prime candidate PRN-0 into the confirmed prime number CPN, without the need to perform any sequential or iterative modification of the prime candidate value PVC. The first device 101 may then transmit or transfer or transport to the second device 102, only that Correction Parameter (and does not need to send any value(s) of any Iterations Counter(s)); and the second device 102 may utilize its Correction-Based CPN Re-Generator 182 to directly and immediately re-generate the confirmed prime number CPN; for example, by utilizing its Deterministic PRNG 122 to generate the initial prime candidate value PRN-0, and then performing a XOR operation of PRN-0 with the Correction Parameter that was received from the first device 101, thereby regenerating directly the full-length confirmed prime number CPN. Such implementations may particularly be utilized in conjunction with relatively small prime numbers, and/or in conjunction with systems that operate in accordance with ANSI X9.31 standard, and/or in proprietary or non-standard implementation of prime number generation that a particular entity may implement.

Other suitable methods or formats may be used to create a compressed version of a full-length confirmed prime number, or to decompress it back to its full-length format or to otherwise re-generate it without primality testing.

Some embodiments may enable reduced memory usage for storing prime numbers, and/or saving in the amount of Secured Memory (which may be sparse or limited) that is used for storing prime numbers. For example, a seed value of 256 bits may be used to generate an RSA cryptographic key having size of 4,096 bits, which then requires 4,096 of secured memory for its storage. In contrast, some implementations may re-generate a large prime number by utilizing, for example, six counters; each counter having, for example, 16 bits of data which typically may be sufficient for counting the iterations until reaching a confirmed prime number; thereby utilizing 6*16=96 bits in total, to represent values of six such counters; or requiring only a total of 352 bits (which is, the 96 bits representing 6 counters, plus the 256 bits of the secret seed) to store an RSA cryptographic key in compressed format. This enables a significant elevenfold saving in the amount of secured memory that is utilized, reducing it (in some demonstrative implementations) from 4,096 bits ton only 352 bits for securely storing a single RSA key. Indeed, storage space in some computerized systems may be abundant; however, Secured Memory may be extremely limited, particularly in small form-factor devices, portable devices, mobile devices, battery-operated devices, Internet of Things (IoT) devices.

Similarly, such implementations may significantly save on (or reduce) the bandwidth that is utilized for transmitting, receiving, transferring and/or transporting cryptographic parameters and/or prime numbers; since, for example, instead of transporting 4,096 bits per RSA key, only 352 bits may be transported per RSA key, in some implementations. The reduction in bandwidth may also translate into a reduction in transmission time/reception time, as well as reduction in the energy resources that are consumed by transmission/reception, or reduction in errors which may occur during such transmission/reception.

In some implementations, a secure communication channel may not necessarily be needed in order to enable secure transfer of the compressed version of the confirmed prime number CPN, from the first device 101 to the second device 102. Rather, the two devices 101-102 may already pre-store the same secret seed S as a shared secret; or, such secret seed may be established on both devices using Diffie-Hellman (DH) key exchange (e.g., the stronger device, namely the first device 101, generating the secret seed using a True Random Number Generator (TRNG) or via other means). The transport of the value of the Iterations Counter (C1), even if intercepted by an attacker, is insufficient for generating the confirmed prime number itself; even if the attacker is also aware of the particular Deterministic PRNG that is used by devices 101 or 102; since the secret seed value is required in order to successfully re-generate the confirmed prime number.

In some embodiments, a secure or protected communication channel is utilized for any communication(s) between the first device 101 and the second device 102, or for at least some of such communications; for example, in order to prevent an attacker or an adversary from intercepting message(s) and replacing them with incorrect data, thereby causing re-generation of a number that is not a confirmed prime number. For example, if the first device 101 insecurely transmits to the second device 102 the message of "17" as the final value of the Iterations Counter C1, then an attacker (e.g., a Man-in-the-Middle or other adversary) may intercept the message and replace the value of "17" with "13", thereby causing the second device 102 to generate a number, after only 13 iterations instead of 17, which the second device 102 would then treat as a confirmed prime number even though that number is not a prime number. Accordingly, the first device 101 may utilize a Message Encryption/Decryption Unit 187, and the second device 102 may utilize a Message Encryption/Decryption Unit 188, in order to encrypt and decrypt message(s) exchanged between them, for example by utilizing cryptographic key(s) that may be derived from the secret seed value S. Other methods may be utilized in order to ensure that communications between the two devices 101-102 are not intercepted or are not tampered with.

In accordance with some implementations, the re-generation or decompression of the prime number at the second device 102, may be performed rapidly and/or efficiently, at a relatively short time-period, while consuming relatively low amount of processing resources and/or memory resources; as such re-generation or decompression does not require involve any primality testing; or, in some implementations, as such re-generation does not require any power-consuming large-number computations or calculations; thereby allowing such re-generation to be rapidly performed even on a "weak" device, such as an IoT sensor or an IoT device, or an entry-level/reduced-features electronic device. This, in turn, may contribute to possible reduction in the cost of producing such IoT devices and/or such electronic devices, which may no longer require significant processing resources for the purpose of generating large prime numbers. Similarly, the re-generation or the decompression of large prime numbers may be performed relatively rapidly, even on reduced-features devices, as it does not require large-number computations or arithmetic.

Figure 2A:
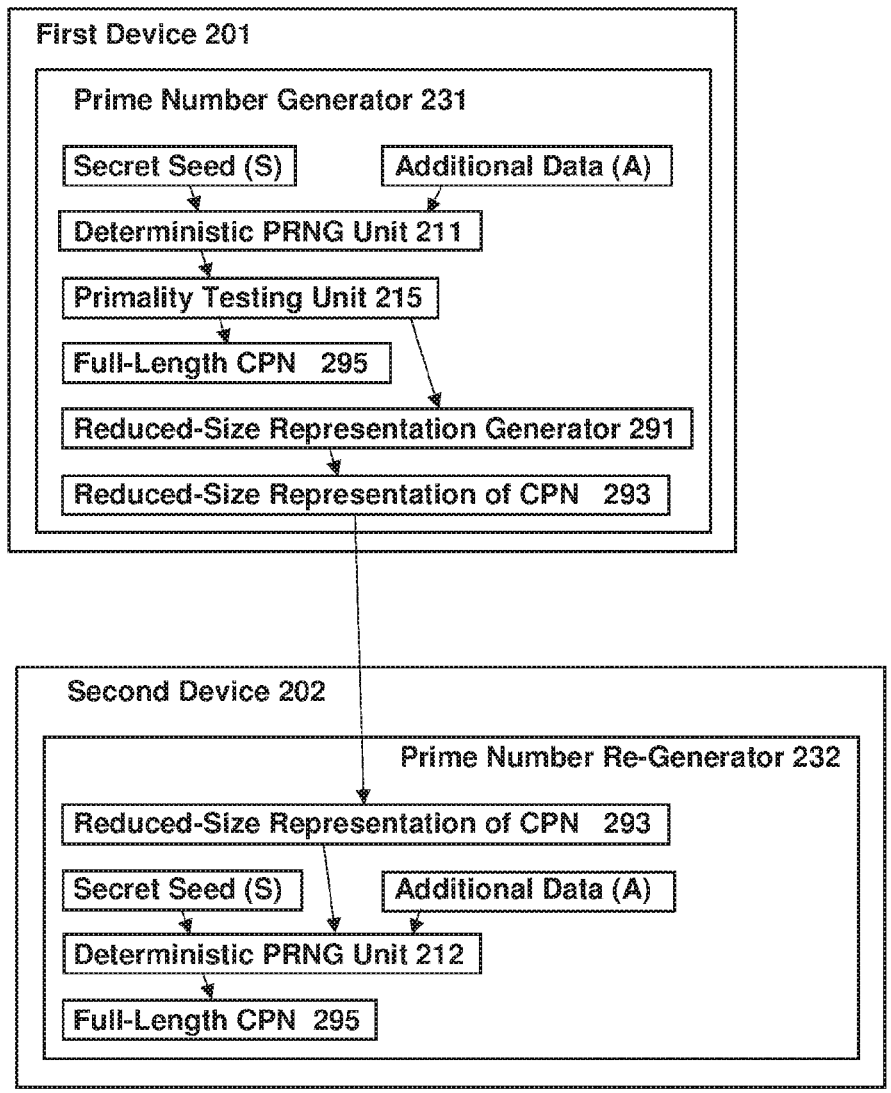
FIG. 2A is a schematic illustration of another system, in accordance with some demonstrative embodiments.

Reference is made to FIG. 2A, which is a schematic illustration of another system 200, in accordance with some demonstrative embodiments. System 200 may be a particular implementation of system 100, modified and configured particularly to enable an RSA cryptosystem (e.g., a non-CRT cryptosystem, which does not utilize the Chinese Remainder Theorem (CRT), to simplify the discussion herein).

For example, a first device 201 may be a computer or a server computer, and may perform full generation of prime numbers including primality testing; whereas, a second device 202 may be a "weaker" electronic device (e.g., a portable device, an IoT sensor, an IoT device), which may only perform re-generation of an already-confirmed prime number based on a compressed version thereof that the second device 202 receives from the first device 101.

Each one of the devices 201-202 stores therein the same secret seed (denoted S), and optionally also the same Additional Data (denoted A). Furthermore, each one of the devices 201-202 comprises and utilizes the same Deterministic PRNG unit (211-212, respectively), as part of a prime number generator unit.

The first device 201 performs a search for large prime numbers, utilizing its Deterministic PRNG unit 211 and/or other components of its prime number generator unit 231 (e.g., which includes a Primality Testing Unit 215 which checks the primality of prime candidate values). The prime number generator unit 231 finds a prime number whose primality is tested and confirmed within the first device 201. Upon such finding of a confirmed prime number CPN (denoted 295), a Reduced-Size Representation Generator 291 of the first device 201 generates a reduced-size representation 293 (or a compressed version) of the confirmed prime number CPN. For example, the reduced-size representation may comprise the final values of six iterations-counters that were utilized by the first device 201 in the iterative operation of its Deterministic PRNG unit. The reduced-size representation 293 comprising these six counter values, may be transmitted or transferred or transported from the first device 201 to the second device 202, instead of transporting the full-length confirmed prime number CPN.

Alternatively, in some implementations, the reduced-size representation 293 of the CPN may be or may indicate a Correction Parameter that enables the second device 202 to re-construct or re-generate the full-length CPN by utilizing the Deterministic PRNG 212 for a single time and then performing a XOR operation of its output with the Correction Parameter received from the first device 201.

The second device 202 receives the reduced-size representation 293, for example, comprising the six counter values, and stores it locally. The Deterministic PRNG unit 212 of the prime number re-generator unit 232 operates iteratively for the number of iterations as indicated by those received values indicated in the reduced-size representation 293. Upon reaching the indicated number of iterations of each one of the six iteration-counters involved, and without performing any primality testing in the second device 202, the output of the prime number re-generator unit 232 is the same confirmed prime number CPN which had been found by the first device 201, and which the second device 202 may then utilize for cryptographic tasks.

In some implementations, for example, system 200 may be used in conjunction with a public key or a private key that is based on a non-secret public exponent E (e.g., which may be relatively short), and a secret private exponent D, and a non-secret modulus N (e.g., having a relatively large, for example, in the range of 2,048 bits to 8,096 bits). The modulus may be constructed from two (or more) large, secret, prime numbers (denoted P and Q), such that N=P*Q. In turn, each one of the large prime numbers (P and Q) may be constructed according to pre-defined security considerations; for example, such that (P−1)=P1*k1, and such that (P+1)=P2*k2; wherein each one of P1 and P2 is also a prime and has a relatively large size (e.g., in the range of 100 bits to 300 bits); wherein each one of K1 and K2 is an integer; and wherein the prime number Q is constructed similarly based on similar pre-defined security considerations. The public exponent E may be chosen as relatively small odd number (for example: 3, or 7, or 65,537). The private exponent D is calculated by deterministic modular inversion function (denoted F), which uses E and P and Q as its parameters; such that D=F (E, P, Q).

The amount of secured storage or cryptographic storage for the RSA cryptosystem may depend on the size of the secret prime numbers that are utilized. Accordingly, if large prime numbers are utilized, then the generation of cryptographic keys may require longer time, and the storage of such cryptographic keys may require more space in the secured memory or secured storage (which may be, for example, limited non-volatile hard-coded memory that is used in secure boot mechanisms or for other sensitive tasks).

Figure 2B:
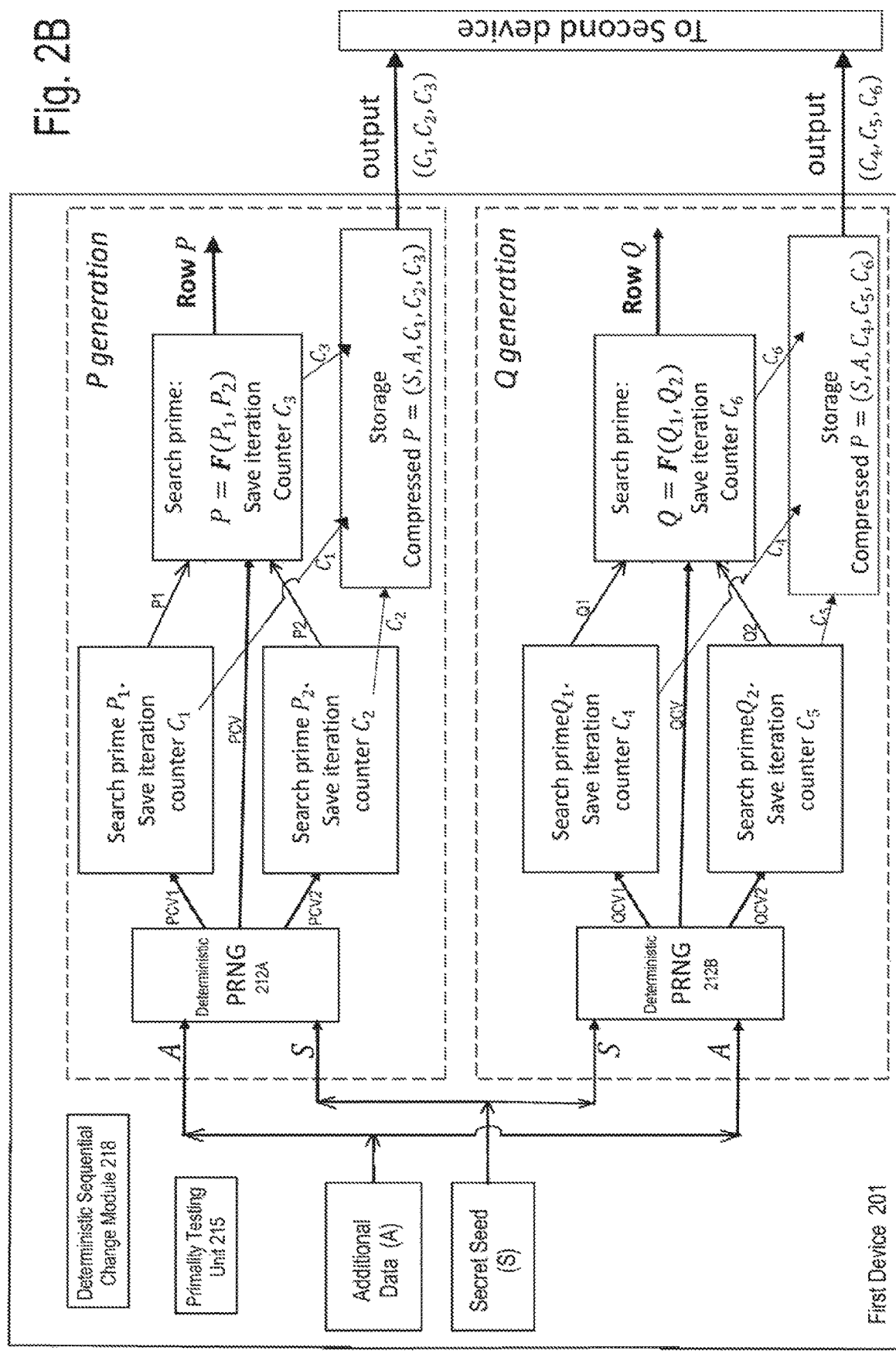
FIGS. 2B and 2C are more detailed illustrations of two devices of that other system.

Reference is made to FIG. 2B, which is a more detailed illustration of the first device 201 of FIG. 2A. Instead of directly generating a large prime number P, the first device 201 operates to generate the large prime number P based on the two auxiliary primes (P1 and P2).

For example, the first device 201 generates an initial prime candidate value for each one of three primes (namely, for P1, and P2, and P), by utilizing its Deterministic PRNG unit 212A which is seeded by the secret seed S and optionally with additional data A (e.g., a device ID, a key ID, or other unique number). Each prime candidate value, denoted respectively as PCV1, PCV2 and PCV, is tested for primality by the Primality Testing Unit 215 of the first device 201. If all the primality tests for all the three prime candidates (P1 and P2 and P) are positive, then the prime generation algorithm stops as a confirmed prime number was found; otherwise, the counter for each appropriate prime candidate value (Counters C1, C2 and C3) is incremented by one, and the next prime candidate value is sequentially calculated (by a Deterministic Sequential Change Module 218 of the first device 201) and then tested for primality. The process is performed iteratively for each one of the three prime numbers of a first set (P1, P2, and P).

The same process is also performed in the first device 201 for finding a second set of three prime numbers (denoted Q1, Q2, and Q), by utilizing a Deterministic PRNG unit 212B which generates prime value candidates (denoted QVC1, QVC2, and QVC), and with iterative, sequential, change of respective candidate values that are counted via three counters (denoted C4, C5, and C6), with primality testing as described.

Upon generation of the confirmed prime number P, the first device 201 stores the current values of the relevant iteration-counters C1 and C2 and C3; for example, as a three-element tuple or triplet (C1, C2, C3), or as a five-element tuple or pentuple (S, A, C1, C2, C3). Similarly, upon generation of the confirmed prime number Q, the first device 201 stores the current values of the relevant iteration-counters C4 and C5 and C6; for example, as a three-element tuple or triplet (C4, C5, C6), or as a five-element tuple or pentuple (S, A, C4, C5, C6).

The first device 201 then generates and sends to the second device 202, a message comprising at least these final values of the six iteration counters (C1, C2, C3, C4, C5, C6); and such message is a compressed representation or a reduced-size version of the prime numbers P and Q, which enables their re-generation by the second device 202 without performing any primality testing in the second device 202.

Figure 2C:
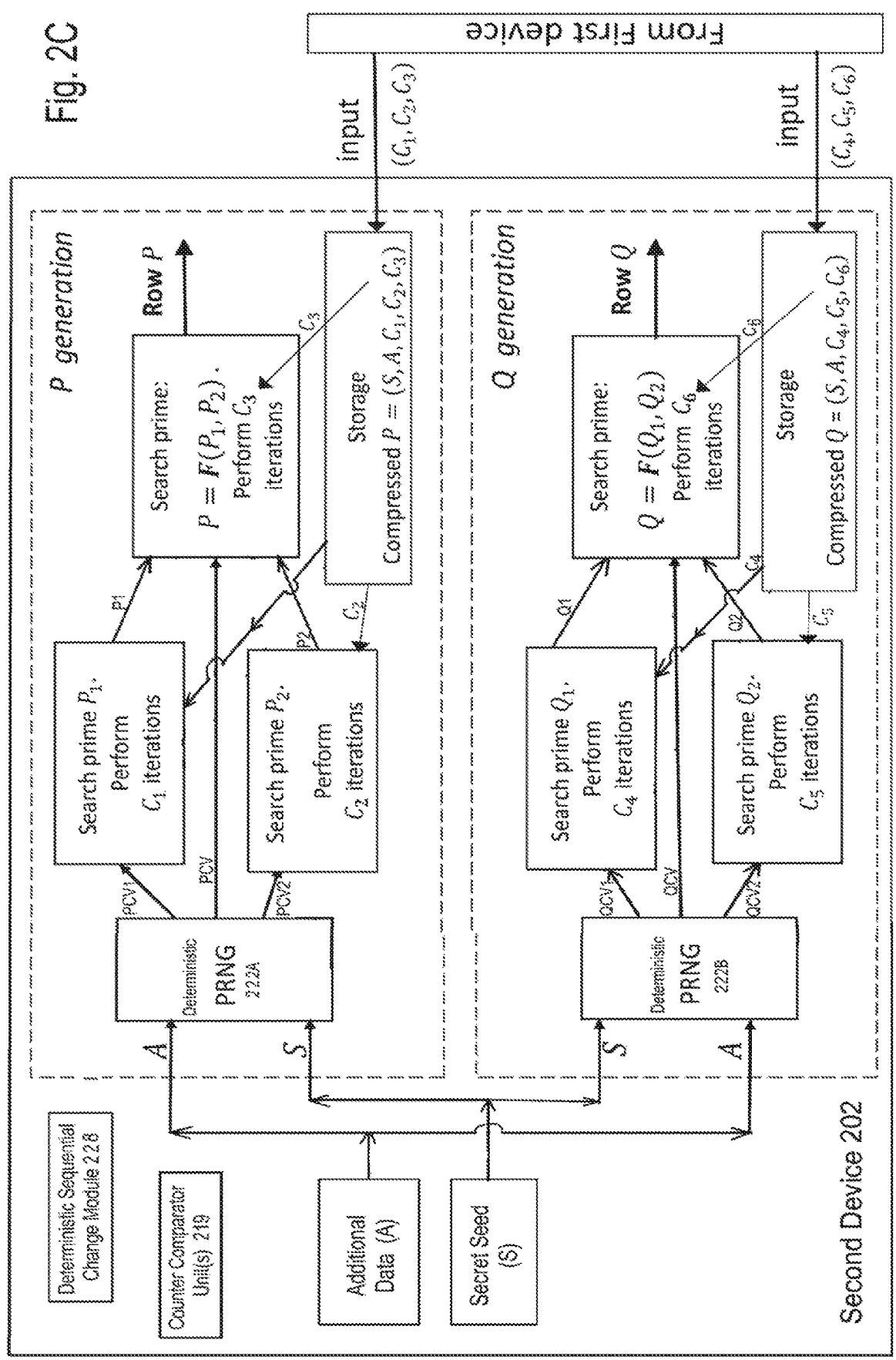

Reference is made to FIG. 2C, which is a more detailed illustration of the second device 202 of FIG. 2A. For example, the second device 202 generates an initial candidate for each one of the three primes (namely, for P1, and P2, and P), by utilizing its Deterministic PRNG unit 222A which is seeded by the secret seed S and optionally with additional data A (e.g., a device ID, a key ID, or other unique number). However, none of these candidates is tested for primality by the second device 202. Rather, the second device 202 utilizes one or more Counter Comparator unit(s) 219, to check whether it had reached exactly the number of iterations that was indicated in the received message (namely: C1, C2, C3, C4, C5, C6). If a counter has not yet reached its target value based on the received message, then the value of that counter is increased by one, and the associated operation is performed one more time; namely, the Deterministic Sequential Change Module 228 of the second device 202 generates the next prime candidate. In contrast, once a counter reaches its target value based on the received message, the operation associated with this counter is not repeated anymore; and once the six counters reach their respective targets, the algorithm stops and yields the two already-confirmed prime numbers (P and Q), without the need to perform any primality testing within the second device 202. The re-generated prime numbers (P and Q) then enable the second device to locally calculate all the relevant parameters of the RSA private key or public key (e.g., the parameters P, Q, N and D), using the public exponent E.

Some embodiments may comprise methods and systems for generation and utilization of one or more (e.g., secret) prime numbers, particularly for cryptographic algorithms or operations or units. For example, a secret seed value (e.g., known to two particular devices, and not known to other devices or entities), and optionally additional data (e.g., a hash value or portion thereof, derived from the secret seed value or from a portion thereof), are utilized as input into at least one Deterministic PRNG unit, which in turn generates an initial prime candidate value (PCV). A stronger device performs primality testing of the initial PCV; a deterministic sequential modification unit modifies the initial PCV into subsequent values, which are tested iteratively, until a first PCV is confirmed as prime number. The stronger device then indicates to a weaker device, how many iterations of such sequential modification are to be performed (from the initial PCV generation) until a prime number is generated; and the weaker device performs locally a similar process, without any primality testing in the weaker device, until it generates the PCV which is the already-confirmed prime. The indication may be, for example, a value of one or more counters that count the iterations of sequential modification of candidate values; or, may be other suitable indication.

Optionally, the Additional Data may comprise, or may include, or may be based on may be derived from, key identification data (KeyID or Key-ID) and/or user identification data (UserID or User-ID), or from a unique Device-ID (e.g., which may be allocated or assigned to a device (e.g., to the weaker device) in a serialization process of such devices).

In some implementations, said final values of counters may be compared to a pre-defined maximal value; and if some or at least one counter exceeds the pre-defined maxima value, then the process of generation of primes may be repeated from the beginning with Deterministic PRNG input data changed according to a deterministic algorithm, possibly by sequential incrementing of any member of such data.

In some implementations, the re-generation of the confirmed prime number at the weaker device, may is performed by the same or equal deterministic algorithms or functions and input data, which was used in the initial generation of the confirmed prime number at the stronger device; and the process of sequential changing of the prime candidate value is performed without primality testing in the weaker device, until the counter(s) of all such iterations have reached the final counters values that were received from the stronger device upon the generation of the confirmed prime number at the stronger device.

A compressed-format or reduced-size representation of prime number(s) may be stored in a storage device or memory unit or repository; for example, indicating the secret seed value, optionally also the additional data, and the value(s) of the iterations counter(s). Optionally, a compressed representation of the confirmed prime number, that is conveyed by the stronger device to the weaker device, may include only an indication of the number of sequential iterations of modifications of the initial PCV that are required to be performed; as the weaker device may already store therein (e.g., securely) the same secret seed value, the same additional data, the same Deterministic PRNG function, and the same deterministic sequential modification function, which were utilized also by the stronger device.

In some implementations, optionally, the first device and the second device may be one-and-the-same, or may be the same single device or system, or may be two units or sub-units of (or co-located within) one single apparatus; for example, such that a first unit of the apparatus generates the confirmed prime number with primality testing, then transfers to the second unit of the apparatus (e.g., directly; or via an intermedia memory unit or storage unit) an indication of the number of iterations to be performed (or, other indication of a reduced-size representation of a confirmed prime number); and then the second unit of that same apparatus re-generates (e.g., at a later time-point) the same already-confirmed prime number by performing the indicated number of iterations and without performing any primality testing by the second unit of the apparatus.

Optionally, the generation, storing, transferring and/or re-generation of prime numbers may be performed as part of generation, storing, transferring and/or re-generation of private and public key pair for an RSA algorithm or for another cryptographic algorithm; for example, by selecting a common public exponent, generating at least two prime factors (P, Q, and optionally additional prime factors) which should optionally meet additional requirements; such as a requirement that for factor P (and similarly, for factor Q, and for optional additional prime factors) the values (P−1) and (P+1) have relatively large prime factors (P1, P2); and such prime numbers may be generated, stored, transferred and/or re-generated according to the method(s) described above.

Optionally, some implementations, such as in cryptographic RSA systems or similar systems, may utilize two (or more) different types of reduced-size representations of already-confirmed prime numbers. For example, a first type of representation may be utilized with regard to confirmed prime numbers whose further utilization is independent of other values or other conditions (e.g., confirmed prime numbers such as P1, P2, Q1, Q2); such that the reduced-size representation of this first type may be based on result of a XOR operation or a Subtract operation, between the final prime candidate value (which is the confirmed prime number) and the initial prime candidate value that was initially generated by the Deterministic PRNG. A second type of representation may be utilized with regard to confirmed prime numbers whose further utilization is dependent on other values or other conditions (e.g., confirmed prime numbers such as P, Q); such that the reduced-size representation of this second type may be based on the values of the counters of iterations of modifications of the initial prime candidate value. Such implementations may utilize two (or more) different types of reduced-size representations for different types of confirmed prime numbers, in order to achieve one or more implementation goals, and particularly in order to achieve enhanced size-reduction of the representation of the confirmed prime number, and/or to reduce the time or the processing resources required for re-generation of the confirmed prime number. For example, with regard to a confirmed prime number whose further utilization is independent of other prime numbers or other conditions, each one of the two types of reduced-size representation may yield a sufficiently small (reduced-size) representation, yet the re-generation of such confirmed prime number may be faster or may be less resource-consuming if the first type of reduced-size representation is utilized (e.g., based on result of a XOR operation or a Subtract operation). In contrast, a confirmed prime number whose utilization is dependent on satisfaction of other conditions (e.g., the utilization is dependent on a particular relation to other prime numbers), the first type of reduced-size representation (e.g., using a XOR operation or a Subtract operation) may yield a reduced-size representation having (in some situations) an excessive length or excessive size, since a large distance may exist between the initial prime candidate value and the final prime candidate value which is the confirmed prime number; whereas, the second type of representation, based on the Iteration Counters values, may yield a smaller-size representation for this second type of confirmed prime numbers, even if the re-generation of such confirmed prime number (in some scenarios) may be slightly slower when this type of reduced-size representation is utilized.

In some implementations, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be preinstalled on a computing device or electronic device, or which may be otherwise transported to and/or installed on such computing device or electronic device.

In some implementations, a device comprises: a memory unit to store a secret seed value, and to store an incoming indication of a number of required iterations; a deterministic Pseudo-Random Number Generator (PRNG), to receive as input said secret seed value, and to generate a candidate value; a deterministic sequential modification unit, to iteratively modify said candidate value for said number of required iterations; a prime number re-generator to output, as a confirmed prime number, the candidate value as sequentially modified for said number of required iterations. Optionally, the memory unit further stores an additional data item; wherein the deterministic PRNG utilizes as input both the secret seed value and the additional data item.

For example, the additional data item comprises at least one of: a hash value of the secret seed value; a portion of a hash value of the secret seed value; a hash value of a portion of the secret seed value; a portion of a hash value of a portion of the secret seed value. For example, the additional data-item comprises at least a portion of a data integrity value that is generated from one or more of: the secret seed value; the number of required iterations; an initial candidate value generated by an initial run of the deterministic Pseudo-Random Number Generator (PRNG) seeded by the secret seed value; a final re-generated prime candidate value. Optionally, the additional data item comprises at least one of: a unique Key-ID of said device; a unique User-ID of said device; a unique Device-ID of said device; a unique serialization identifier of said device.

For example, said memory unit is to store incoming final-values of six iterations counters; wherein said prime number generator is to sequentially search for two prime numbers (P, Q) and two respective sets of prime factors (P1, P2; Q1, Q2), that comply with pre-defined conditions, by iteratively modifying candidate values of said two prime numbers and said prime factors until reaching said incoming final-values of all iterations counters and/or comparison conditions. Optionally, the device further comprises: a cryptographic unit to utilize said confirmed prime number in at least one operation selected from: an encoding operation, a decoding operation, a cryptographic operation. Optionally, the device further comprises: a wireless communication receiver to wirelessly receive from a remote server, over a secure wireless communication link, said incoming indication of number of required iterations. Optionally, said prime number generator outputs said confirmed prime number without performing any primality testing of any candidate value.

In some implementations, an apparatus comprises: a memory unit to store a secret seed value, and to store an additional data-item; a deterministic Pseudo-Random Number Generator (PRNG), to receive as input said secret seed value and said additional data-item, and to generate a candidate value; a deterministic sequential modification unit, to iteratively modify said candidate value, wherein an iterations counter is incremented upon each iteration of said deterministic sequential modification unit; a primality testing unit, to determine that a particular candidate value is a confirmed prime, and to output a current value of said iterations counter; a generator of reduced-size representations of prime numbers, to generate a reduced-size representation of said confirmed prime which enables a remote device to locally re-generate said confirmed prime.

For example, the apparatus further comprises: a wireless communication transmitter to transmit to a remote device, via a secure wireless communication link, a message indicating said current value of said iterations counter; wherein said message enables said remote device to locally re-generate said confirmed prime based on (i) said message, and (ii) said secret seed value, and (iii) said additional data-item. Optionally, the generator of reduced-size representations of prime numbers is to generate a reduced-size representation of said confirmed prime which comprises said current value of said iterations counter. Optionally, the generator of reduced-size representations of prime numbers is to generate a reduced-size representation of said confirmed prime which comprises a difference between (i) said confirmed prime number, and (ii) an initial candidate value generated by said deterministic PRNG unit. Optionally, the generator of reduced-size representations of prime numbers is to generate a reduced-size representation of said confirmed prime which comprises a result of a XOR operation between (i) the least-significant K bits of said confirmed prime number, and (ii) the least-significant K bits of an initial candidate value generated by said deterministic PRNG unit. Optionally, said generator of reduced-size representations of prime numbers is to sequentially search for two prime numbers (P, Q) and two respective sets of prime factors (P1, P2; Q1, Q2), that comply with pre-defined conditions, by (I) iteratively modifying candidate values of said two prime numbers and said prime factors until reaching a set of confirmed prime numbers, and (II) storing six final values of six respective iterations counters, which enable a remote device to re-generate therefrom said two prime numbers and said prime factors.

In some implementations, a device comprises: a memory unit to store a secret seed value; a deterministic Pseudo-Random Number Generator (PRNG), to receive as input said secret seed value, and to generate a candidate value; a deterministic sequential modification unit, to iteratively modify said candidate value for one or more iterations via a deterministic value-modification function; at least one of: (I) a prime number generator, comprising: a primality testing unit, to determine that a particular candidate value is a confirmed prime, and to output a current value of an iterations counter upon reaching said confirmed prime; a generator of reduced-size representations of prime numbers, to generate a reduced-size representation of said confirmed prime which enables another unit to re-generate said confirmed prime from said reduced-size representation; (II) a prime number re-generator, to receive as input an incoming indication of a number of required iterations, to cause said deterministic sequential modification unit to iteratively modify said candidate value for said number of required iterations, wherein an iterations counter is incremented upon each iteration of said deterministic sequential modification unit, and to output, as a confirmed prime number, the candidate value as sequentially modified for said number of required iterations.

Optionally, the device comprises both the prime number generator and the prime number re-generator, implemented as two co-located units within a same housing, and having shared access to said secret seed value. For example, the device further comprises a storage unit to store reduced-size representations of prime numbers; wherein said prime number generator generates full-length confirmed prime numbers, and writes reduced-size representations of confirmed prime numbers into said storage unit; wherein said prime-number re-generator reads from said storage unit reduced-size representations of confirmed prime numbers, and re-generates said confirmed prime numbers. Optionally, the device comprises both the prime number generator and the prime number re-generator, implemented as two co-located units within a same housing, and having shared access to said secret seed value; wherein a single deterministic PRNG serves both the prime number generator and the prime number re-generator; wherein a single deterministic sequential modification unit serves both the prime number generator and the prime number re-generator.

In some embodiments, a method comprises: re-generating at a first electronic unit, a number that was already confirmed as a prime number at a second unit, by performing: generating a candidate value via a deterministic Pseudo-Random Number Generator (PRNG) function, which is fed with a secret seed value known to said first unit and to said second unit; sequentially modifying said candidate value in a deterministic manner for a particular number of modification-iterations that is indicated in a message sent from the second unit to the first unit. Optionally, the method comprises: upon performance of said particular number of modification-iterations of said candidate value, outputting a latest candidate value as a re-generated already-confirmed prime number. Optionally, the method comprises utilizing said re-generated already-confirmed prime number in a cryptographic operation.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

The invention claimed is:

1. A device comprising:
a memory unit to store a secret seed value, and to store an incoming indication of a number of required iterations, wherein said incoming indication is comprised in an incoming message that said device receives from a remote apparatus which has a primality-testing unit, and wherein said device lacks a primality-testing unit;
a deterministic Pseudo-Random Number Generator (PRNG), to receive as input said secret seed value, and to generate a candidate value that is a pseudo-random number;
a deterministic sequential modification unit, to iteratively modify said candidate value that is a pseudo-random number, for said number of required iterations that was indicated to said device in said incoming message received from said remote apparatus;
a prime number re-generator to output, as a confirmed prime number, the candidate value as sequentially modified for said number of required iterations, wherein the prime number re-generator is configured to re-generate said confirmed prime number without performing any primality testing of any candidate value in said device, and by utilizing exclusively: (i) a pre-defined deterministic PRNG function that generates pseudo-random numbers, and (ii) a secret seed value that was received by said device from said remote apparatus, and (iii) an incoming message that was received from said remote apparatus and that indicates the number of required iterations that the prime number re-generator should perform on the deterministic PRNG function in order to yield an already-confirmed prime number that was already tested for primality at said remote apparatus.

2. The device of claim 1,
wherein the memory unit further stores an additional data item;
wherein the deterministic PRNG utilizes as input both the secret seed value and the additional data item.

3. The device of claim 2,
wherein the additional data item comprises at least one of:
a hash value of the secret seed value;
a portion of a hash value of the secret seed value;
a hash value of a portion of the secret seed value;
a portion of a hash value of a portion of the secret seed value.

4. The device of claim 2,
wherein the additional data item comprises at least a portion of a data integrity value that is generated from one or more of:
the secret seed value;
the number of required iterations;
an initial candidate value generated by an initial run of the deterministic Pseudo-Random Number Generator (PRNG) seeded by the secret seed value;
a final re-generated prime candidate value.

5. The device of claim 2,
wherein the additional data item comprises at least one of:
a unique Key-ID of said device;
a unique User-ID of said device;
a unique Device-ID of said device;
a unique serialization identifier of said device.

6. The device of claim 1,
wherein said memory unit is configured to store incoming final-values of six iterations counters;
wherein said prime number generator is configured to sequentially search for two prime numbers (P, Q) and two respective sets of prime factors (P1, P2; Q1 Q2), that comply with pre-defined conditions, by iteratively modifying candidate values of said two prime numbers and said prime factors until reaching said incoming final-values of all iterations counters and/or comparison conditions.

7. The device of claim 1, further comprising:
a cryptographic unit configured to utilize said confirmed prime number in at least one operation selected from: an encoding operation, a decoding operation, a cryptographic operation.

8. The device of claim 1,
wherein said prime number re-generator is configured to outputs said confirmed prime number without performing in said device any primality testing of any candidate value.

9. An apparatus comprising:
a memory unit to store a secret seed value, and to store an additional data-item;
a deterministic Pseudo-Random Number Generator (PRNG), to receive as input said secret seed value and said additional data-item, and to generate a candidate value that is a pseudo-random number;

a deterministic sequential modification unit, to iteratively modify said candidate value, wherein an iterations counter is incremented upon each iteration of said deterministic sequential modification unit;
a primality testing unit, to determine that a particular candidate value, which is a pseudo-random number that was generated by said deterministic PRNG, is a confirmed prime, and to output a current value of said iterations counter that indicates a number of modification iterations that should be performed by said deterministic PRNG until said particular candidate value is reached;
a generator of reduced-size representations of prime numbers, to generate a reduced-size representation of said confirmed prime which enables a remote device to locally re-generate said confirmed prime; wherein said reduced-size representation, that is generated by the generator of reduced-size representations of prime numbers, indicates the number of modification iterations that should be performed by said deterministic PRNG until said particular candidate value is reached.

10. The apparatus of claim 9, further comprising:
a wireless communication transmitter to transmit to a remote device, via a secure wireless communication link, a message indicating said current value of said iterations counter;
wherein said message enables said remote device to locally re-generate said confirmed prime, without performing any primality testing at said remote device, based on (i) said message, and (ii) said secret seed value, and (iii) said additional data-item.

11. The apparatus of claim 9,
wherein the generator of reduced-size representations of prime numbers is configured to generate a reduced-size representation of said confirmed prime which comprises a difference between (i) said confirmed prime number, and (ii) an initial candidate value generated by said deterministic PRNG unit.

12. The apparatus of claim 9,
wherein the generator of reduced-size representations of prime numbers is configured to generate a reduced-size representation of said confirmed prime which comprises a result of a XOR operation between (i) the least-significant K bits of said confirmed prime number, and (ii) the least-significant K bits of an initial candidate value generated by said deterministic PRNG unit.

13. The apparatus of claim 9,
wherein said generator of reduced-size representations of prime numbers is configured to sequentially search for two prime numbers (P, Q) and two respective sets of prime factors (P1, P2; Q1, Q2), that comply with pre-defined conditions, by (I) iteratively modifying candidate values of said two prime numbers and said prime factors until reaching a set of confirmed prime numbers, and (II) storing six final values of six respective iterations counters, which enable a remote device to re-generate therefrom said two prime numbers and said prime factors.

14. A device comprising:
a memory unit to store a secret seed value;
a deterministic Pseudo-Random Number Generator (PRNG), to receive as input said secret seed value, and to generate a candidate value which is a pseudo-random number;
a deterministic sequential modification unit, to iteratively modify said candidate value for one or more iterations via a deterministic value-modification function, and to track the number of performed iterations;
at least one of:
(I) a prime number generator, comprising:
a primality testing unit, to determine that a particular candidate value is a confirmed prime, and to output a current value of an iterations counter upon reaching said confirmed prime;
a generator of reduced-size representations of prime numbers, to generate a reduced-size representation of said confirmed prime which enables another unit to re-generate said confirmed prime from said reduced-size representation;
(II) a prime number re-generator,
to receive as input an incoming indication of a number of required iterations,
to cause said deterministic sequential modification unit to iteratively modify said candidate value for said number of required iterations, wherein an iterations counter is incremented upon each iteration of said deterministic sequential modification unit,
and to output, as a confirmed prime number, the candidate value as sequentially modified for said number of required iterations.

15. The device of claim 14,
wherein the device comprises both the prime number generator and the prime number re-generator, implemented as two co-located units within a same housing, and having shared access to said secret seed value;
wherein the prime number generator has access to said secret seed value, and is performs primality testing;
wherein the prime number re-generator is co-located with the prime number generator, and also has access to said secret seed value, but does not perform any primality testing.

16. The device of claim 14, further comprising:
a storage unit to store reduced-size representations of prime numbers;
wherein said prime number generator performs primality testing and generates full-length confirmed prime numbers, and writes reduced-size representations of confirmed prime numbers into said storage unit;
wherein said prime-number re-generator does not perform primality testing, and reads from said storage unit reduced-size representations of confirmed prime numbers, and re-generates said confirmed prime numbers based on said reduced-size representations.

17. The device of claim 14,
wherein the device comprises both the prime number generator and the prime number re-generator, implemented as two co-located units within a same housing, and having shared access to said secret seed value;
wherein a single deterministic PRNG serves both the prime number generator and the prime number re-generator;
wherein a single deterministic sequential modification unit serves both the prime number generator and the prime number re-generator.

\* \* \* \* \*